United States Patent [19]
Alric et al.

[11] 3,900,785
[45] Aug. 19, 1975

[54] DEVICE FOR MONITORING THE CHARGING CURRENT FOR A STORAGE BATTERY OF ACCUMULATORS

[75] Inventors: Andre Alric; Xavier Carlet; Robert Nozeran; Pierre Gentet, all of Haute Garonne, France

[73] Assignee: Societe Nationale Industrielle Aerospatiale, Paris, France

[22] Filed: Apr. 9, 1974

[21] Appl. No.: 459,335

[30] Foreign Application Priority Data
Apr. 17, 1973 France .......................... 73.13846

[52] U.S. Cl. ............... 320/39; 317/36 TD; 320/48; 340/249
[51] Int. Cl.[2] ..................... H02J 7/00; H02H 3/08
[58] Field of Search ............ 320/39, 40, 31, 32, 43, 320/48; 317/36 TD, 50, 51, 33 SC, 33 C; 340/248, 249

[56] References Cited
UNITED STATES PATENTS
| | | | |
|---|---|---|---|
| 3,594,557 | 7/1971 | Anderson | 317/36 TD |
| 3,703,675 | 11/1972 | Alric et al. | 320/39 X |

FOREIGN PATENTS OR APPLICATIONS
| | | | |
|---|---|---|---|
| 1,227,630 | 4/1971 | United Kingdom | 320/39 X |

*Primary Examiner*—J. D. Miller
*Assistant Examiner*—Robert J. Hickey
*Attorney, Agent, or Firm*—Karl W. Flocks

[57] ABSTRACT

A device for monitoring the charging current for a storage battery of accumulators which will release an alarm when the charging current continues to increase during a set period of time, characterized in that the device contains a means of measuring the current through the storage battery and a further means of transforming the current to a voltage which is placed in a memory system at regular intervals by a switch responding to the recurrent signals from a timing device and is subjected to a comparison with the value of the voltage across the terminals to provide information displayed on a meter when the second value of the voltage exceeds the reference voltage at the instant when a signal is derived from a signal from the time device which signal slightly leads the recurring signals provided by the timing device for the control of the switch, the absence of this information at the instant of the derived signal providing via a logic gate, a signal to reset the meter to zero while the output from the meter provides a control signal for an alarm device.

17 Claims, 3 Drawing Figures

DEVICE FOR MONITORING THE CHARGING CURRENT FOR A STORAGE BATTERY OF ACCUMULATORS

This invention concerns a device for monitoring the charging current for a storage battery of storage cells or accumulators, and allows an abnormal increase of charging current to be detected. It is useful for monitoring the charging current of storage batteries which have a small quantity of electrolyte as in aircraft.

It is known that when proceeding to charge a storage battery at constant voltage from which no current is being drawn, that the charging current diminishes as the charge progresses.

It is also known that certain storage batteries, notably those of the alkaline type in which the quantity of the electrolyte is reduced as the charge progresses, can be rendered useless and with serious risk of explosion caused by thermic acceleration and electrolyte dissociation. Indeed, in the event of the storage battery being overheated, its internal resistance decreases, and this accelerates the heating process still more, causing distortion of the plates and the separators. The electrolyte within the storage battery is thus disocciated into gas by a process of electrolysis.

In order to preserve such storage batteries it is very important to detect the rate of charge which produces this dangerous situation. That a storage battery is at risk is sometimes revealed by the use of thermal detectors placed in contact with the storage battery, but in order to obtain good results it would be necessary to use an impracticably large number of such detectors, and these quite apart from the difficulty in mounting, would also cause problems when installing any storage batteries in a restricted space.

In our U.S. Pat. No. 3,703,675 a device has already been proposed which would charge a storage battery by connecting only the battery to the source of charge for limited periods of time whilst monitoring the rate of charge by using inter alia an Hall-effect detector to measure the intensity of the current.

In this scheme, an alarm device is tripped when, in the charging sequence, the current continues to constantly increase during a determined period. This is effected by using a voltage representative of the charging current, the voltage being fed to a modulated RC shunt network. When the voltage increases, the signal from the RC network is transmitted to a time delay relay which remains closed until such time that an increase in current is acceptable. The relay also controls an alarm signal.

The method described in the above-mentioned patent is complicated.

This complication is overcome according to the invention by incorporating a device for monitoring the charging current for a storage battery of accumulators which will release an alarm when the charging current continues to increase during a set period of time, the device containing means for deriving an electric voltage proportional to the charging current, a memory system, timer means for generating recurrent timing signals, switching means operatable by each one of said timing signals for storing the instantaneous value of said electric voltage in said memory system, means for comparing the previously stored value of said electric voltage with its actual value, a pulse counter having a counting input, a reset input and an output, means for generating, at a time just preceding the timing signal which follows next said one timing signal, a first or a second pulse according to whether said actual value is superior or inferior to said stored value, means for transmitting said first or second pulse to said counting input or to said reset input of the counter, respectively, and an alarm device connected to the output of said counter.

This may be effected by using a servo switch which responds to the recurring signals emitted by a timing device, these signals being compared to the actual value of the voltage to supply, when the secondary value is greater than the primary value, data which is fed to a meter in the form of a signal derived from the timing device and which would precede the subsequent signals. The signals provided by the timing device and fed to the servo switch would, in the absence of this data at the instant of the derived supply signal, trigger a pulse to return the meter to zero. This is effected by means of a logic gate, whereas the output from the counter provides a control signal for the alarm device.

As stated in United Kingdom Patent Specification 1349079, it is possible to obtain a permanent measure of the value of the charging current by using a detector utilizing the Hall-effect. More simply and more economically, a resistor of small resistance value can be mounted in the charging circuit, preferably between earth and one of the poles of the storage battery. By measuring the voltage at the terminals of the resistor, the strength of the current through the storage battery at any given instant can be determined.

The shunt resistor of an ammeter normally mounted in the charging circuit may conveniently be used for this purpose.

The voltage that is used as the measure of the current need only be taken into account above a certain threshold value, which threshold value automatically excludes the functioning of the device for low values of charging current, which are of course of no danger to the storage battery and can therefore be increased with no ill effect.

Furthermore, coincident with the comparison of the voltage stored in memory with the actual voltage, the actual voltage is compared to a reference to verify the direction of current flow, i.e., to determine that it is a charging current. If it is a charging current then the outputs of two comparators provide, via an AND-gate, a signal which is fed to the meter.

In such a device, since the time of storing the voltage in memory follows so closely the time of comparing the value of the actual voltage previously stored, if the next comparison discloses that the actual voltage is greater than the voltage in the memory, this evidently signifies that there is a permanent average increase of voltage and consequently an increase in the value of the charging current. The constant increase of this current can then be established.

The capacity of the meter, multiplied by the duration of the interval between the signals from the timing device, gives the time during which an increase in charging current can be accepted before causing the alarm to trip.

However, if the increase of charging current ceases, or if the storage battery is discharged, then the logic gate previously referred to will provide a signal to return the meter to zero so that the alarm will not be released until such time as a command signal is input to the meter.

The invention will now be described by way of example only with reference to the figures of the accompanying drawings in which.

Figure 1:
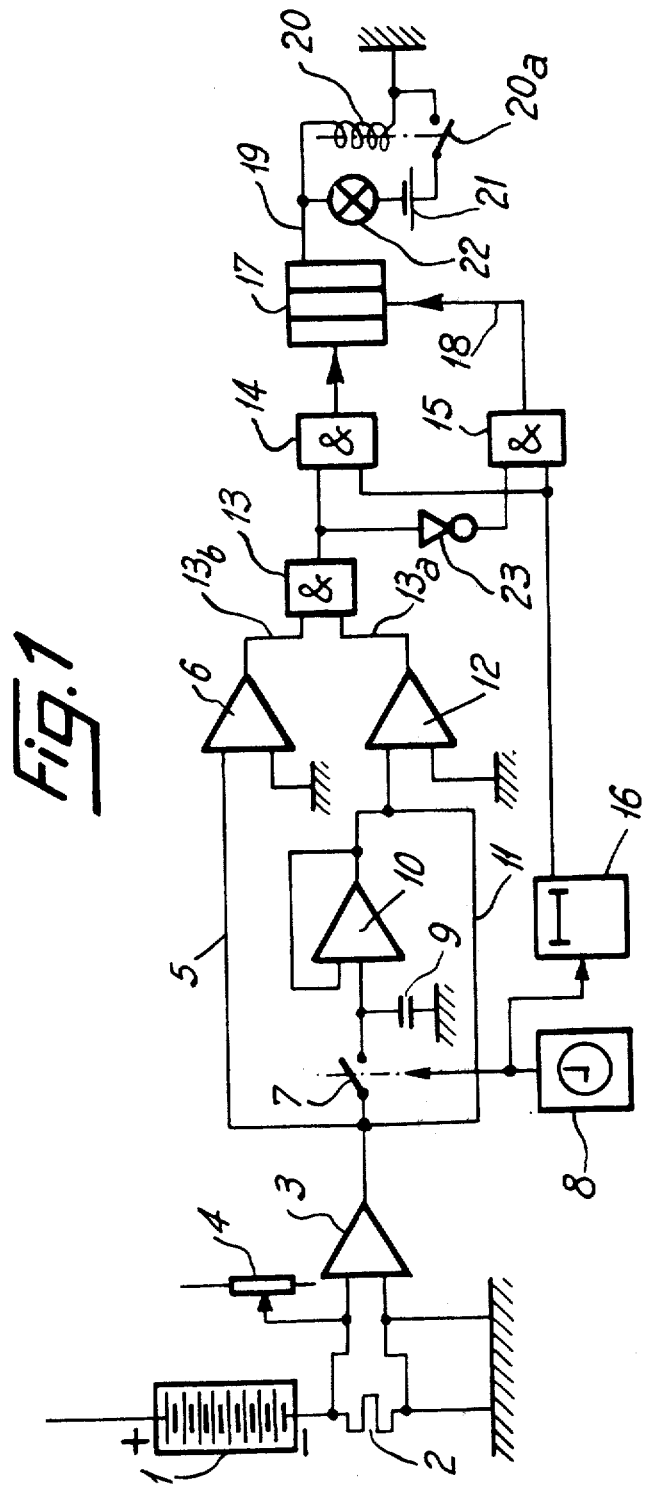
FIG. 1 is a simplified circuit diagram of the device for monitoring the charging current for a storage battery.

The storage battery 1 shown in FIG. 1 is, for example, a substantially leakproof type of alkaline battery. In the charging circuit for this storage battery a weak series resistor 2 is installed between the negative pole and earth, and the potential acts as a reference.

A voltage representing the charge or discharge current appears at the terminals of the resistor 2 and this forms an input to differential amplifier 3. One part of the input goes to earth and the other part to a potentiometer 4 which determines the voltage threshold from which the differential amplifier 3 provides an outgoing positive signal.

The output of differential amplifier 3 is divided between three branches of the circuit. The first of these branches 5 drives a differential amplifier 6 when the negative input terminal is at earth. The second branch of the circuit is fed via a servo switch 7 to a timing device 8 coupled to a capacitor 9 which acts as the memory.

One terminal of this capacitor is earthed and imparts an impedance to the input of a unity gain amplifier 10 when the output from the capacitor is imparted to the amplifier's second input terminal.

A second amplifier transmits a voltage to the capacitor 9 but does not cause it to discharge.

By the third branch 11, the output of differential amplifier 3 is fed in opposition to the output of amplifier 10 and the resultant signal is relayed as an input to an amplifier 12 where the negative output is, for example, earth.

The outputs of amplifiers 6 and 12 become the inputs of AND-gate 13 whose output is fed directly to form an input to AND-gate 14 and, via the inverter 23, to form one of the inputs to AND-gate 15.

The other inputs to the two AND-gates 14 and 15 receive, via a retarding device 16 (which can be of any convenient type), a signal which is derived from a command signal from the servo switch 7, but this signal is delayed to operate in a time which is somewhat shorter than the interval between the recurrent signals emitted by the timing device 8.

The output of AND-gate 14 forms one of the inputs to the meter 17 whereas the output from AND-gate 15 is fed via path 18 to control the zero return for the meter.

In the simplified diagram of FIG. 1, output 19 of the meter 17 energizes the coil of relay 20 whereupon contact 20a placed in series with current source 21 supplies feedback to the coil of relay 20 after the excitation of the coil provided by the meter 17, and the illumination of a visual alarm indicator 22.

In this arrangement, differential amplifier 3 is exposed to low impedance output as whenever the servo switch 7 briefly closes, the output voltage from the amplifier is stored in memory by the capacitor 9 without having to cancel the charge of the capacitor by discharging it to earth.

It is therefore necessary that the time constant, determined by the value of the capacitor 9 and the impedance of the differential amplifier 3 fed to the capacitor, will be shorter than the time taken to close servo switch 7 at each control pulse from the timing device 8.

At the output of amplifier 10 the voltage stored in memory is in opposition to the voltage of the differential amplifier 3, i.e., a representation of the actual value of the charging current. Thus, a signal 1 appears at the input 13a to AND-gate 13 when the difference in compared voltage is positive.

However, a signal 1 also appears at the input of 13b of this gate only if the current passes effectively through the weak series resistor 2 of the earth towards the negative pole of the storage battery, that is to say, if it is in fact a charging current.

In these conditions, AND-gate 13 provides a signal 1 as one of the inputs to AND-gate 14, and also provides a zero signal to AND-gate 15.

The retarding device 16 then supplies a brief signal 1, to be followed shortly by a new signal which closes servo switch 7.

Whilst the signal 1 is already present at AND-gate 14, the counting pulse reaches the input to meter 17 and the zero signal is maintained on path 18. Inversely, if AND-gate 13 produces no signal, no impulse reaches the meter, which will receive however, a signal via path 18 to return to zero.

Relay 20 is engaged when a series of uninterrupted pulses corresponding to the capacity of the meter has been entered, and causes illumination of visual alarm indicator 22.

Figure 3:
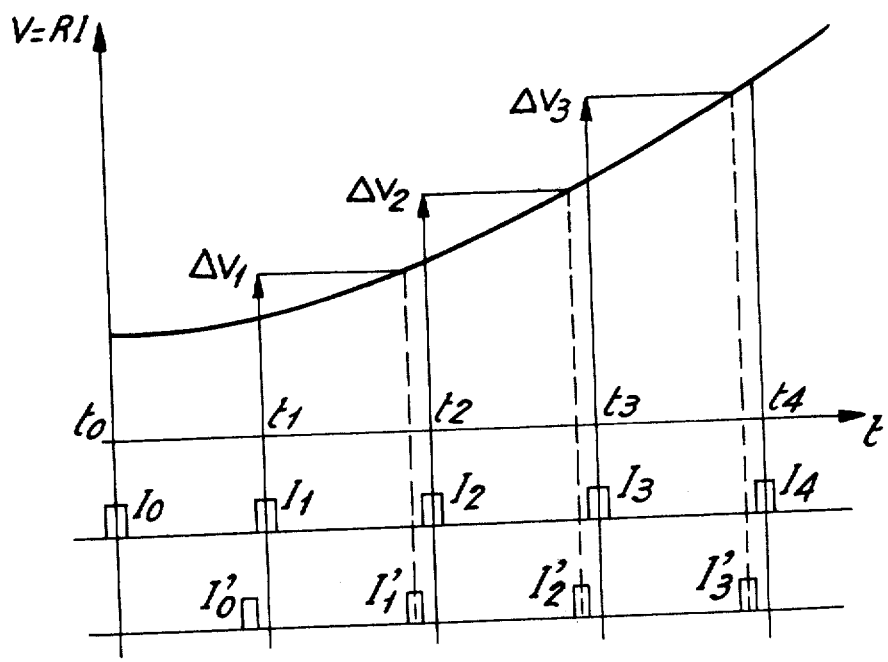
FIG. 3 is a functional graph of current against voltage drop.

The results obtained when the current is increased during three consecutive intervals of time are shown in FIG. 3.

In the times $t_0 \ldots t_4$, the timing device 8 delivers control pulses $I_0 \ldots I_4$ for the servo switch 7. Derived pulses $I'_1 \ldots I'_3$ appear slightly ahead of each of these times, so that the voltage fluctuations $\Delta V_1$, $\Delta V_2$, $\Delta V_3$ are measured by the amplifier 12 where the indication is detected by amplifier 6.

Figure 2:
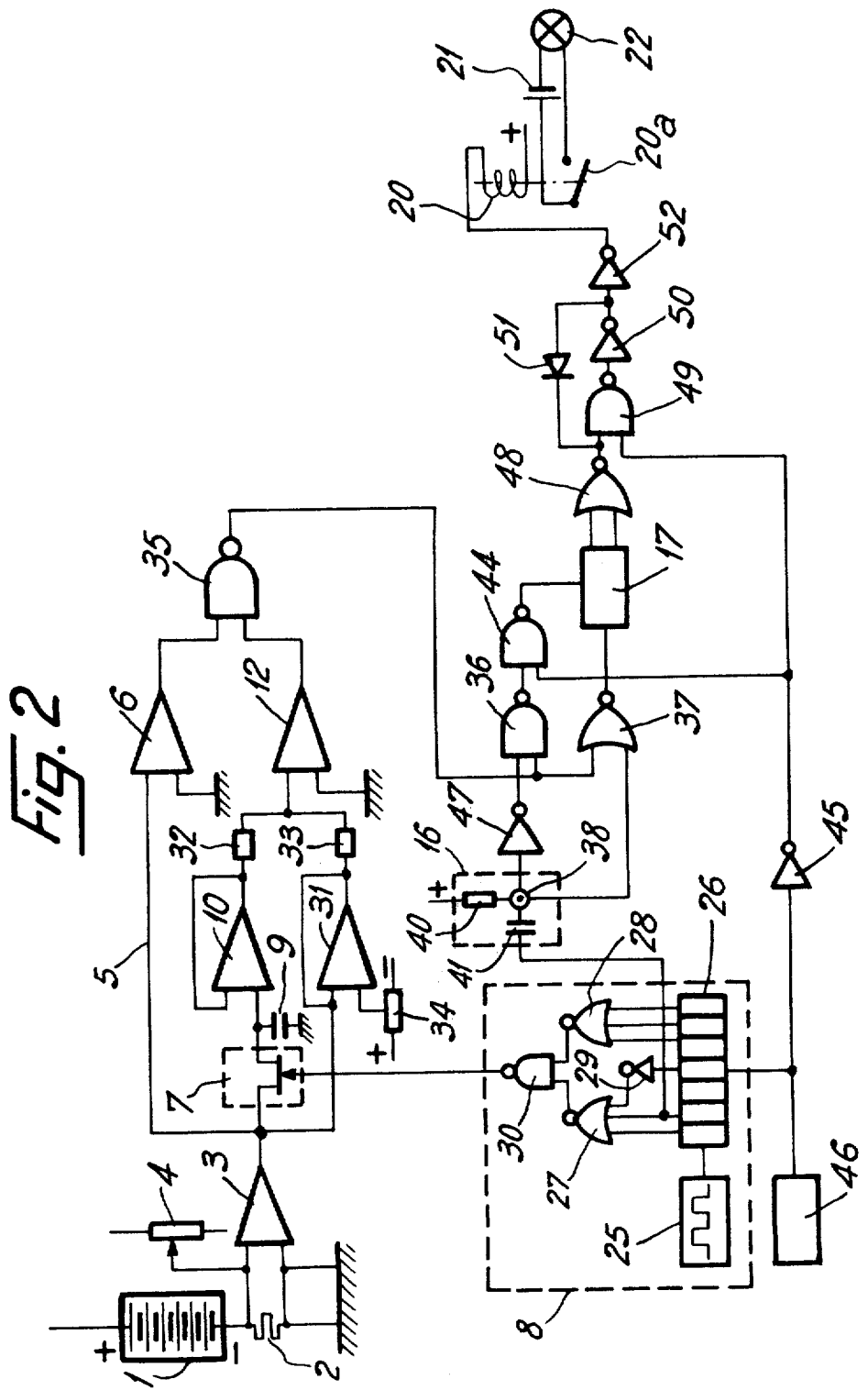
FIG. 2 shows a complete circuit diagram of the device.

The arrangement shown in FIG. 1 can be effected in many different ways as far as its components are concerned. FIG. 2 shows a practical example.

In FIG. 2, the clock is a pulse generator 25 giving recurring pulses which generate a rectangular waveform with, for example, a frequency of two hertz for a period of half a second of time.

The pulses are fed to a meter 26 in seven stages, then six outputs are fed, three to the NOR-gate 27 and three to the NOR-gate 28 (one of these connexions includes an inverter 29) and then to an NAND-gate 30.

This combination gives at the output of the NOR-gate, a zero state with a duration of one second and with a period of recurrence of approximately one minute, or $2^7$ periods of 0.5 second (viz. 128 periods of 0.5 second).

The switch 7 can be an analogue switch, e.g. a field effect transistor.

For an aircraft storage battery with a nominal voltage of twenty four volts, the resistor 2 has, for example, a resistance value of $2 \times 10^{-4}$ ohm. It therefore provides a voltage of 2.4 millivolts when a current of 250 amps is passed through it.

The output voltage of differential amplifier 3 is opposed to the output voltage of amplifier 10 by the intermediary of amplifier 31 which is analogous to amplifier 10 (a high voltage amplifier of high impedance), the opposition being effected by means of resistors 32 and 33.

Instead of being relayed to earth, the second input of the amplifier 31 is relayed to a potentiometer 34 which imposes a certain negative potential on to the input. The actual voltage, before being compared to the voltage stored in memory, will thus be limited to a determined value which will permit the admittance of a certain increase of current without causing the intervention of the alarm device, that is to say, the voltage taken by the potentiometer 34 determines the increase of the level current.

Gate 35 is equivalent to gate 13 and is a NAND-gate which normally supplies a signal 1 and only supplies a zero signal when the outputs of amplifiers 6 and 12 both supply a signal 1 (current increasing).

The output of gate 35 forms one of the inputs of NAND-gate 36 and NOR-gate 37. The second input to gate 37 is relayed to a connexion point 38, whilst the second input to gate 36 is fed to point 38 by the intermediary of an inverter 47.

The connexion point 38 is the output of a differential network formed by the junction of resistor 40 and the capacitor 41.

Resistor 40 is relayed at its free end to a positive voltage whilst the capacitor 41 is connected to the output of the last flip flop of the meter 26, i.e. the bistable which provides the square wave signal with a duration of about one minute. The combination of gates 27, 28, 30 and the inverter 29 gives a signal of one second duration but which will not disengage until a second after the square wave collapses, which takes about one minute.

Thus, in differentiating the collapse of the waveform, a brief pulse is obtained ($I'_0, I'_1 \ldots$ FIG. 3) due to the network formed by resistor 40 and capacitor 41. This pulse precedes the pulses $I_1, I_2, I_3$ by a second to store in memory the voltage to the terminals of resistor 2, but can be considered as following the storage of $I_0, I_1 \ldots$ by an interval of one minute.

By virtue of the resistor 40, a signal state 1 is permanently imposed at point 38 except at instants when pulse I' causes the point to briefly assume the zero state.

When the signals from AND-gate 35 and point 38 (impulse) reach the NOR-gate 37, to give two zero states, a pulse is directed to the meter 17.

Meanwhile, the NAND-gate 38 is followed by a second NAND-gate 44 which, on the second input receives the signal inverted by the inverter 45 to a device 46 which is used to reset the meter to zero.

In normal working, the device 46 provides a zero state; the input 44a of gate 44, shown at the bottom of the figure of the drawing as normal receives the signal 1.

When the storage battery is functioning normally, gate 35 provides a signal 1 (discharge of battery or normal charge), on an input to gate 36, another signal 1 appears at the output of the inverter 47 and a zero signal is sent to the second input of gate 47 which delivers a signal 1 at its output. Thus, the meter 17 is reset to zero (if it was not already so set) at each stage of the comparison.

Conversely, if gate 35 provides a zero signal to gate 36, then the inverter 47 sends a signal 1 or a zero signal to gate 36 giving to its input a signal 1 and the gate 44 permanently maintains a zero signal to the meter 17. In this case, the meter resets to zero.

Experience shows that an increasing charge of three minutes duration justifies the release of the alarm, the meter does not trigger more than two flip flops and the number three is detected in the meter by the state of the flip flops which are connected to NOR-gate which provides a state 1 (release of the alarm) where they receive two zero states.

In place of a feedback as shown in FIG. 1, this state is memorized to render the alarm permanent. To achieve this, the output of gate 48 is relayed to an input of NAND-gate 49 whose other input receives a state 1 signal from the inverter 45 via the reset device.

In case of alarm, the signal from gate 49 then provides a zero state retransformed in state 1 by the inverter 50 which resends the signal to the larger input of gate 49 via the diode 51. It thus maintains two states 1 at the input of gate 49.

The inverter 50 is followed by another inverter 52 which, on receiving a state 1 signal, puts the extremity of the coil of relay 20 to earth, and the other end of the coil is fed to a positive pole.

The inverse situation for all the last-mentioned gates and inverters is evidently obtained when the two inputs to gate 48 do not simultaneously receive two zero states.

To put the device back into service, or when starting, to put it into service, the device 46 supplies a pulse corresponding to a state 1. This pulse directly sets the meter 26 back to zero. To cross the inverter 45, a zero state is applied to one of the inputs of NAND-gates 44 and 49 such that the outputs appear as a state 1, and this resets the meter 17 to zero and also removes from the memory the alarm state stored by the components 49, 50 and 51.

What is claimed and deisred to be secured by Letters Patent is:

1. Device for monitoring the charging current for a storage battery of accumulators, specially for releasing an alarm if the charging current continuously increased during a predetermined time, said device comprising means for deriving an electric voltage proportional to the charging current, a memory system, timer means for generating recurrent timing signals, switching means operatable by each one of said timing signals for storing the instantaneous value of said electric voltage in said memory system, means for comparing the previously stored value of said electric voltage with its actual value, a pulse counter having a counting input, a reset input and an output, means for generating, at a time just preceding the timing signal which follows next said one timing signal, a first or a second pulse according to whether said actual value is superior or inferior to said stored value, means for transmitting said first or second pulse to said counting input or to said reset input of the counter, respectively, and an alarm device connected to the output of said counter.

2. The device as defined in claim 1, characterized in that the means for deriving a voltage proportional to charging current through the storage battery is a resistor mounted in series in the circuit of the storage battery.

3. The device as defined in claim 2, characterized in that the resistor is a shunt of an ammeter.

4. The device as defined in claim 1, characterized in that the said means for comparison of the voltages feeds its results to an AND-gate resulting in the detection of the current.

5. The device as defined in claim 1, characterized in that the device at the threshold of voltage determines the value over which the voltage at the terminals is decided in advance.

6. The device as defined in claim 2, characterized in that the two terminals of the resistor are connected with the inputs to a differential amplifier, one of the terminals being connected to a voltage source determined at the threshold.

7. The device as defined in claim 1, characterized in that the voltage is stored in said memory system by a capacitor and removed therefrom by a unity gain high impedance amplifier, said voltage being compared to the value of the voltage.

8. The device as defined in claim 1, characterized in that the value of the voltage is applied to the input of a differential amplifier with a unity gain when the other input is connected to a voltage source which determines the increase in voltage acceptable at the terminal voltage during the interval of time between storing in memory and the comparison.

9. The device as defined in claim 7, characterized in that the outputs of the unity gain amplifier are mounted in opposition to one of the two inputs to a differential amplifier where the other input is connected to a reference voltage.

10. The device as defined in claim 1, characterized in that the information for comparison and the derived signal are simultaneously supplied to AND-type logic gates where the outputs are respectively supplied to the input of a meter and to a zero reset device.

11. The device as defined in claim 1, characterized in that the timing means consists of an impulse generator associated with a binary counter with staged bistable devices the control pulse for the switching means being obtained by the average of a combination of logic gates associated with the output voltages of the various bistable devices of the counter.

12. The device as defined in claim 11, characterized in that the derived pulses are obtained by applying the output voltage of the bistable device with the highest range to a differentiating network, the combination of logic gates providing an unbalanced impulse in advance of the interval of time defined by the first bistable device of a meter, to agree with the waveform of the output voltage controlled by the differentiating network.

13. A device for monitoring the charging current for a storage battery of accumulators which will release an alarm when the charging current continues to increase during a set period of time, said device comprising means for deriving an electric voltage proportional to the charging current, a memory system, timer means for generating recurrent timing signals, switching means operatable by each one of said timing signals for storing the instantaneous value of said electric voltage in said memory system, means for comparing the previously stored value of said electric voltage with its actual value, a pulse counter having a counting input, a reset input and an output, means for generating, at a time just preceding the timing signal which follows next said one timing signal, a first or a second pulse according to whether said actual value is superior or inferior to said stored value, means for transmitting said first or second pulse to said counting input or to said reset input of the counter, respectively, and an alarm device connected to the output of said counter, said means for comparing voltages feeding the result of the said comparison to an AND-gate resulting in the detection of the current, said comparison voltages and the derived signal being simultaneously supplied to AND-logic type gates where the outputs are respectively supplied to the input of the meter and to a zero reset device, said timing means consisting of an impulse generator associated with a binary counter with staged bistable devices the control pulse for the switch being obtained by the average of a combination of logic gates associated with the output voltages of the various bistable devices of the counter, the derived pulses being obtained by applying the output voltage of the bistable device with the highest range to a differentiating network, the combination of logic gates providing an unbalanced impulse in advance of the interval of time defined by the first bistable device of the meter, to agree with the waveform of the output voltage controlled by the differentiating network, a NAND-gate receiving as its input the result of the comparison of the voltages and the result of the detection of the direction of current flow, the output of said gate being connected for entry into the counter, to an input of a NOR-gate while the other input is connected to the differentiating network and, to set the counter to zero, to the input of a NAND-gate where the other input receives an inverse signal to reset to zero, when the output of the NAND-gate is connected to the counter.

14. The device as defined in claim 1, characterized in that the output of the counter is connected to said alarm device by the average maintained by the information supplied by a meter.

15. The device as defined in claim 1, characterized in that the counter is of the binary type and its output is constituted by a NOR-gate where the inputs are connected to the outputs of the bistable devices of the counter which determine the maximum number before being entered into the counter.

16. The device as defined in claim 15, characterized in that the averages of maintenance are constituted by the loop consisting of a NAND-gate, an inverter and a diode, the loop being closed by the input of this NAND-gate and connected to the output of the NOR-gate at the output of the counter, the other input of this NAND-gate receiving the inverse of the signal to reset to zero voluntarily.

17. The device as defined in claim 6, characterized in that the output of the differential amplifier is connected to a capacitor which forms said memory system, the impedance of said amplifier being sufficiently weak to allow the time constant determined by the capacitor and said impedance to be inferior to the duration of the closure of said switching means.

* * * * *